May 8, 1962  H. M. FOX  3,032,970
DISPOSABLE ROCKET MOTOR
Filed Jan. 25, 1957  6 Sheets-Sheet 1

INVENTOR.
H. M. FOX
BY *Hudson and Young*
ATTORNEYS

May 8, 1962  H. M. FOX  3,032,970
DISPOSABLE ROCKET MOTOR
Filed Jan. 25, 1957  6 Sheets-Sheet 2

INVENTOR.
H.M. FOX
BY Hudson and Young
ATTORNEYS

May 8, 1962 H. M. FOX 3,032,970
DISPOSABLE ROCKET MOTOR
Filed Jan. 25, 1957 6 Sheets-Sheet 4
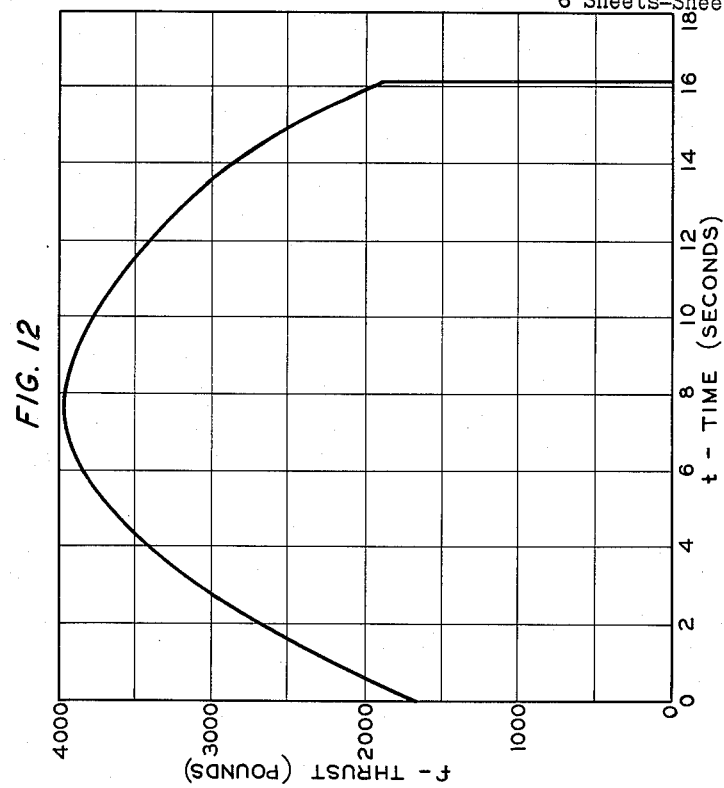
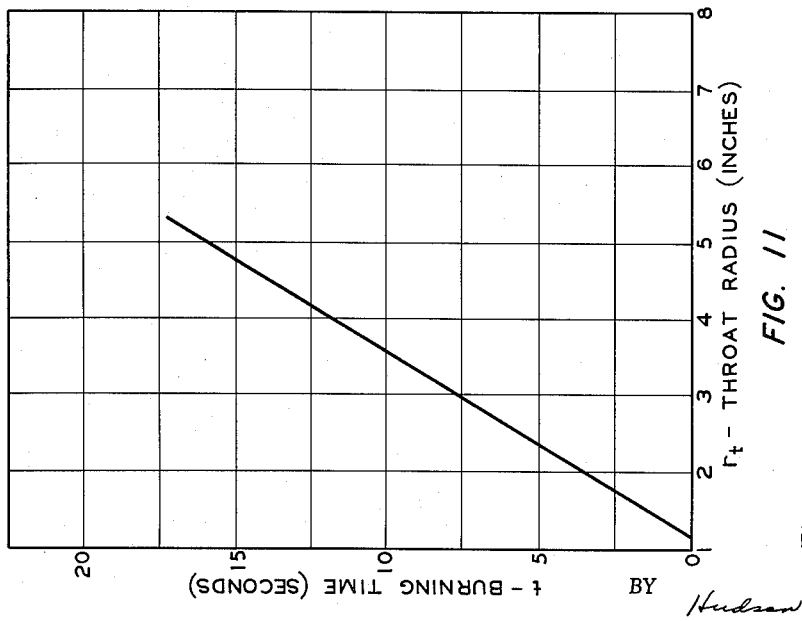
INVENTOR.
H.M. FOX
BY Hudson and Young
ATTORNEYS May 8, 1962    H. M. FOX    3,032,970
DISPOSABLE ROCKET MOTOR
Filed Jan. 25, 1957    6 Sheets-Sheet 5

INVENTOR.
H.M. FOX

BY *Hudson and Young*

ATTORNEYS

May 8, 1962     H. M. FOX     3,032,970
DISPOSABLE ROCKET MOTOR
Filed Jan. 25, 1957     6 Sheets-Sheet 6

INVENTOR.
H. M. FOX
BY *Hudson and Young*

ATTORNEYS

United States Patent Office 3,032,970
Patented May 8, 1962

3,032,970
DISPOSABLE ROCKET MOTOR
Homer M. Fox, Bartlesville, Okla., assignor to Phillips Petroleum Company, a corporation of Delaware
Filed Jan. 25, 1957, Ser. No. 636,285
1 Claim. (Cl. 60—35.3)

This invention relates to rocket motors. In one aspect, this invention relates to a disposable rocket motor. In another aspect, this invention relates to rocket motors fabricated of propellant material.

Large missiles are usually composed of two power plants, one called the booster and the other called the sustainer. The booster is required to provide a high initial thrust to accelerate the missile from take-off to a very high velocity in a short period of time. Prior art shows that detachable rocket booster units have generally been used because there has been little justification for carrying along the weight of a spent booster unit after launching has been accomplished. As soon as the booster burns out, it is automatically detached to reduce the flight weight of the missile. The booster usually has a solid rocket propellant system. The sustainer can be a liquid rocket, solid rocket, ramjet, or a rocket-ramjet system. The ramjet is usually the most economical system to manufacture, when considering fuel costs, and has a greater range than many other types of power plants. However, other power systems sometimes have advantages which make them more acceptable than ramjet systems for certain specific applications.

In present rocket motor applications employing solid rocket propellants it is customary to employ an expensive metal case or housing. Said case or housing forms the combustion chamber of the motor. In most instances an exhaust nozzle is attached to the rearward end of the case or housing. A solid propellant material is placed within the case and upon burning, produces large volumes of gases under high pressure which are exhausted from the combustion chamber through the nozzle at high velocity, and the reaction resulting from the flow of the gas masses through said nozzle creates the propulsive thrust. Said case or housing must have sufficient strength to withstand the loads imposed on it and at the same time must be as light as possible. Elimination of the metal case would reduce the weight of the rocket motor by a considerable amount and thus improve the overall performance of the rocket.

As mentioned above, in booster rocket applications the metal case or housing is jettisoned when the booster propellant has been consumed. This jettisoning is accompanied with several disadvantages. One major disadvantage is that the heavy case can fall in thickly populated areas and possibly cause considerable loss of life and/or damage to property. Another disadvantage is that the launching equipment and personnel must be kept out of the expected impact area or else protected with heavy concrete bunkers. In wartime conditions, the case can fall into the hands of the enemy.

I have found that the above difficulties can be overcome to a great extent by fabricating the rocket motor of propellant material which is consumed in flight and/or, as discussed further hereinafter, disintegrates when the web has decreased to a predetermined thickness. Any particles of the motor which remain unburned after such disintegration will burn before striking the earth. Obviously a rocket motor which is thus consumed cannot cause loss of life or damage to property, or cannot fall into the hands of the enemy. Thus, broadly speaking, my invention comprises a rocket motor fabricated from propellant material.

There are other advantages, performancewise, of a rocket motor fabricated from propellant material, i.e., a "caseless" rocket motor, which are more important than the advantages of eliminating "fall-out" of the booster case. This is shown by a consideration of the following factors:

$$V_B = I_{sp} ln \frac{M_i}{M_f}$$

$V_B$ = burn-out velocity
$I_{sp}$ = specific impulse
$M_i$ = initial mass
$M_f$ = final mass The "caseless" rocket motor reduces $M_f$ and in the extreme limits $V_B$ approaches infinity. Of course $M_f$ cannot be zero when the rocket motor is used as a source of power for a payload but since the payload is small relative to the mass of the total missile $M_i/M_f$ will be a large number. Even though specific performance is adversely affected by the low pressures required in the "caseless" rocket, the favorable effect of the large value of $M_i/M_f$ offsets the adverse affect on specific performance and in fact even surpasses it.

Thus, while the use of the rocket motor of the invention in booster rocket applications is one of the presently more important uses of said motor, the invention is not so limited. The rocket motor of the invention can be employed as the sole source of power to deliver a payload, such as a warhead in a military missile. In such instances, the rocket motor would be designed to deliver the payload just prior to burnout. The rocket motor can also be used in multi-stage applications, for example, as a second, third or fourth stage operating at high altitude in a substantial vacuum in which case the specific impulse would not be low. Specific impulse is a function of $P_c/P_o$ ($P_c$ = combustion chamber pressure, and $P_o$ = ambient pressure) and as $P_o$ approaches a vacuum, $P_c$ does not have to be very high to give a high specific performance. In other words, the rocket motor could be operated at 10, 20 or 30 p.s.i.a., just high enough to obtain good combustion, and the stress on the combustion chamber would be small. $V_B$ of such a rocket can be extremely high.

An object of this invention is to provide an improved rocket motor. Another object of this invention is to provide rocket motor fabricated from propellant material. Still another object of this invention is to increase the overall performance efficiency of rocket motors. Still another object of this invention is to provide a "caseless" rocket motor. Other aspects, objects and advantages of the invention will be apparent to those skilled in the art upon reading this disclosure.

Thus according to the invention, there is provided a rocket motor comprised of propellant material, which motor comprises a generally cylindrical mass of propellant material having an axially disposed recess therein, said recess forming the combustion chamber of said motor, the outer wall of said combustion chamber being an outer wall of said motor, and an exhaust nozzle for said combustion chamber.

FIGURES 9 to 12 inclusive illustrate the relationships between certain variables in the design and operation of one type of rocket motor in accordance with the invention.

Figure 14:
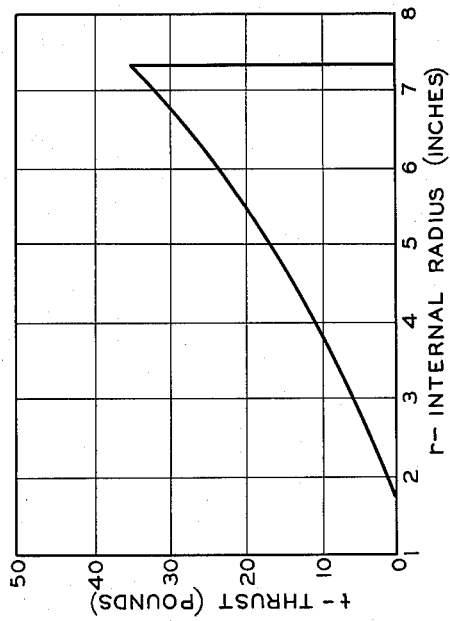
Figure 13:
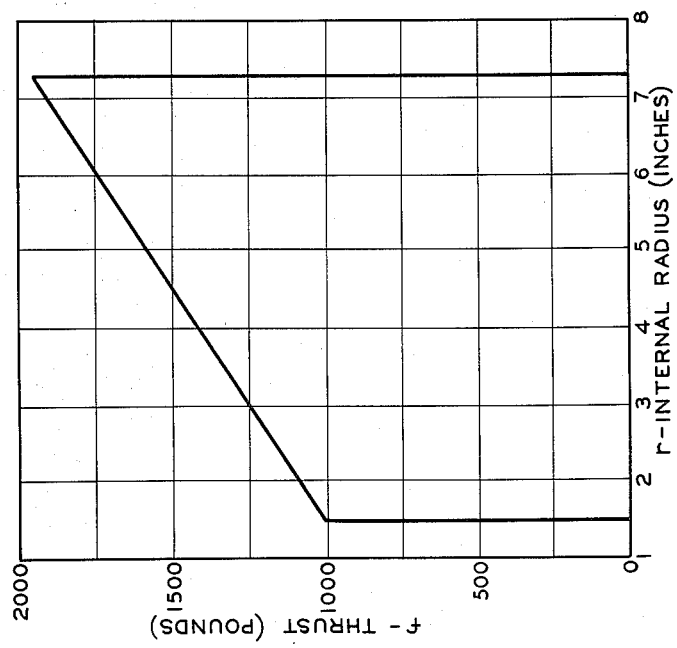
Figure 15:
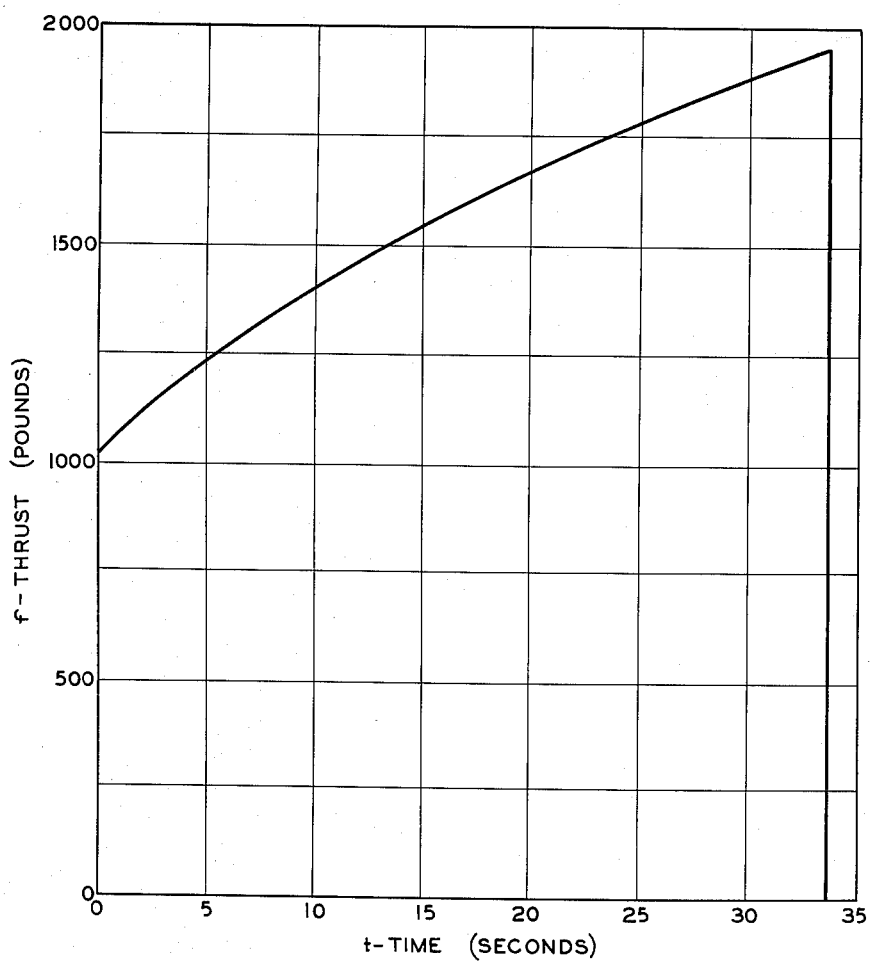

FIGURES 13 to 15 inclusive illustrate the relationships between certain variables in the design and operation of a second type of rocket motor in accordance with the invention.

In one embodiment of the invention, the combustion chamber and the nozzle of the rocket motor are fabricated from propellant material and consist essentially of said propellant material and a restrictor material applied to the outer surface of both said combustion chamber and said nozzle. This embodiment offers the maximum protection from a safety standpoint because all of the outer surfaces of the rocket motor are covered with the slower burning restrictor material. In some instances, only the nozzle portion of the rocket motor is covered with restrictor material.

In another embodiment of the invention, reinforcing materials are incorporated into the outer skin of the combustion chamber portion of the motor. Said reinforcing materials can be applied to the propellant material while it is in an uncured state so that upon curing, the reinforcing material will cure into the outer skin of the propellant material forming the combustion chamber portion of the motor. By thus incorporating the reinforcing material into the outer skin of the combustion chamber portion, reproducibility of the point of breakup is increased and there is some extension of burning time as discussed further hereinafter. Said reinforcing material can be any suitable material such as filaments, wires, or strips of metals; such as magnesium, aluminum, copper, iron, and tin (as in alloys such as bronze); or fabrics such as nylon. Said reinforcing material is preferably a combustible material. The metal wires or filaments are of such small size as to readily burn when the web burns through and they are exposed to the flame front in the burning propellant. They can be applied to the combustion chamber before curing, as described, in any suitable manner, such as by circular wrapping, diagonal wrapping, or longitudinal placement, and then applying restrictor material, or the reinforcing materials can be applied after the restrictor material has been applied to the rocket motor and then cured into the restrictor material. Thus, herein and in the claims, the term "outer skin," when employed in connection with the location of the reinforcing material, is employed generically and includes reinforcing material in the skin of the propellant material forming the combustion chamber, and reinforcing material in the restrictor material, unless otherwise specified.

In still another embodiment of the invention, longitudinal reinforcing ribs are formed on the exterior surface of the combustion chamber during extrusion or molding of same.

Figure 1:
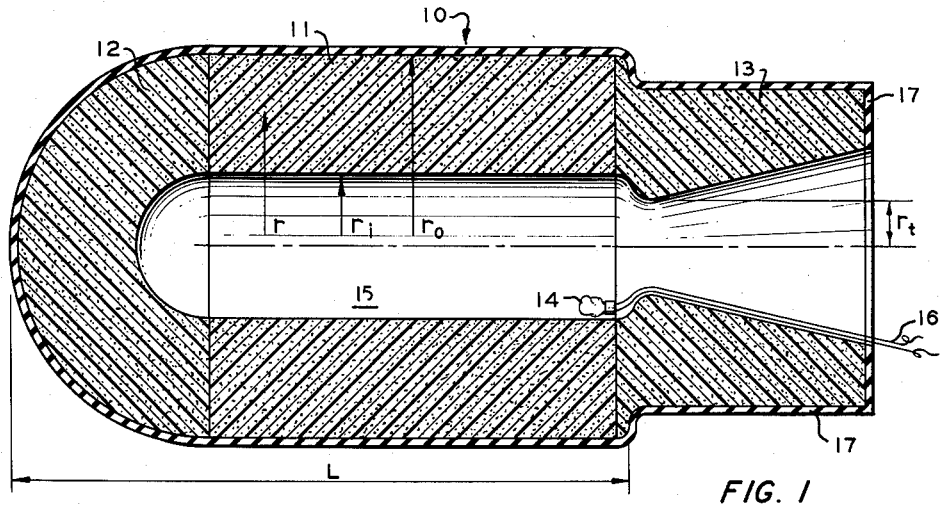
FIGURE 1 is a cross section of one form of rocket motor fabricated of propellant material in accordance with the invention.
Figure 2:
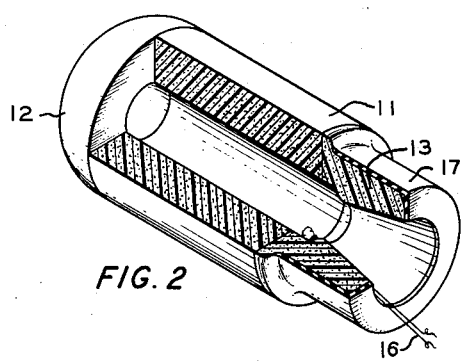
FIGURE 2 is an elevation of a rocket motor fabricated of propellant material having the nozzle portion only covered with a restrictor material.

Referring now to the drawings, the invention will be more fully explained. In FIGURE 1, there is illustrated one form of the rocket motor of the invention, designated generally by the reference numeral 10, and comprising a combustion chamber section 11, a head section 12, and a nozzle section 13. Said combustion chamber section 11 and said head section 12 together form the combustion chamber portion of said motor. Said nozzle section 13 is in the form of a conventional venturi-shaped nozzle. Said head section generally defines a segment of a sphere and, in a preferred form has a recess in the uncurved side thereof. It will be noted that said rocket motor is a generally cylindrical mass of propellant material having an axially disposed recess 15 therein. Said recess 15 forms the combustion chamber of the rocket motor. Igniter means 14 is placed within said recess 15 and is attached to a suitable source of current by means of lead wires 16. The outer surfaces of the entire rocket motor in this embodiment of the invention are covered with a restrictor material 17.

Figure 3:
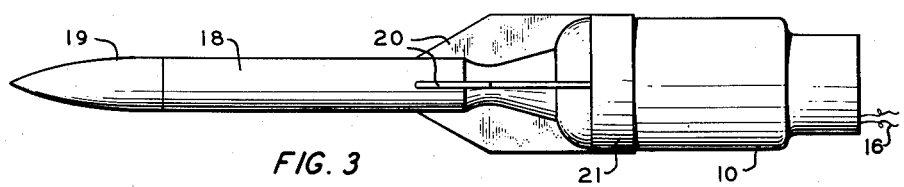
FIGURE 3 illustrates one means of attaching a payload or sustainer rocket to the rocket motor of the invention.

In FIGURE 3, the rocket motor of FIGURE 1 is shown attached to a dart body or sustainer rocket 18. Said dart body or sustainer rocket has a warhead 19. Fins 20 are provided for stabilization of the rocket in flight. Attached to said fins 20 is a ring member 21 adapted to closely engage the outer surface of rocket motor 10 at a point below the head curvature. Ring member 21 has a smooth internal surface adapted to fit closely around motor 10. Ring member 21 can be cemented to said motor 10 by any suitable cement.

Dart body or sustainer 18 can be either self-propelled or not self-propelled. Thus while one of the present more important uses of the rocket motor of the invention is as a booster rocket, the invention is not so limited. The rocket motor of the invention can be employed as the only source of power for a missile or payload to which it is attached. When the only source of power is the rocket motor of the invention, said rocket motor can be designed so that the missile reaches its destination before burn-out of said motor. This application of the invention is particularly useful in military missiles. In non-military applications the rocket motor of the invention can be designed so that burn-out occurs just prior to arrival at the destination. The payload would then be landed by remote control from a control station at the destination. When the rocket motor of the invention is employed as a booster unit to aid in the launching of a dart body or sustainer rocket, suitable disengaging means can be provided for disengaging the booster rocket motor just prior to complete burn-out and after the propellant in the sustainer has been ignited. The propelling means which can be provided within dart body 18 can be any suitable propelling means available in the prior art.

In one of the presently preferred forms of the rocket motor of the invention, ring member 21 is not cemented to motor 10 as described above. Said ring member fits closely but relatively loosely around said motor 10 with just enough friction between said ring member and said motor to hold the two elements together prior to launching. After the missile is launched, the thrust developed will hold the rocket motor in the ring member 10. Thus, by virtue of this close but relatively loose fit, when the rocket motor is burned out and disintegrates, the sustainer rocket 18 and rocket motor 10 are parted because thrust from said rocket motor ceases. Upon disintegration of the rocket motor, the particles will fall from ring member 21.

Figure 4:
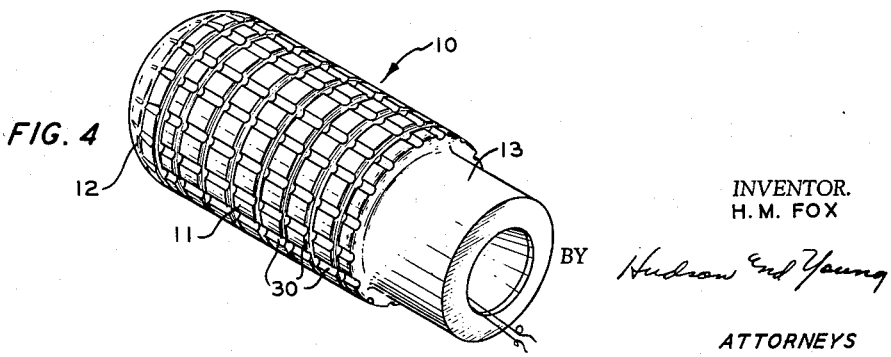
FIGURE 4 illustrates one form of the rocket motor of the invention wherein a network of grooves is provided in the outer surface of the combustion chamber section.
Figure 5:
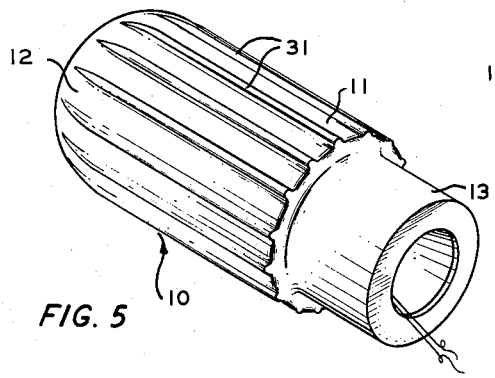
FIGURE 5 illustrates another form of the rocket motor of the invention wherein protruding ribs are provided on the outer surface of the combustion chamber section.

In one of the presently preferred forms of the rocket motor of the invention, a network of longitudinal and transverse grooves 30, as illustrated in FIGURE 4, is provided in the outer surface of the combustion chamber of the motor. Thus when burning proceeds to a predetermined point, as determined by said grooves, the rocket motor will disintegrate uniformly throughout the body thereof and fall freely from ring member 21. Longitudinal ribs 31, as illustrated in FIGURE 5, formed on the outside of the rocket motor is another way of accomplishing this result. If desired, the transverse grooves shown in FIGURE 4 can be eliminated and a plurality of longitudinal grooves only provided in the outer surface of the combustion chamber. When longitudinal grooves or longitudinal ribs are provided said grooves and ribs can be formed in any suitable manner, such as by employing suitable dies in the extrusion machine, or suitable molds when the combustion chamber section is formed by compression molding or casting. Suitable molds can be employed in the compression molding or casting methods to provide a network of grooves.

When the rocket motor of the invention is used as a booster rocket, the invention is not to be limited to any specific means for disengaging said booster rocket from the sustainer rocket or payload. Any disengaging means, including mechanical devices known to the prior art, can be employed.

Figure 6:
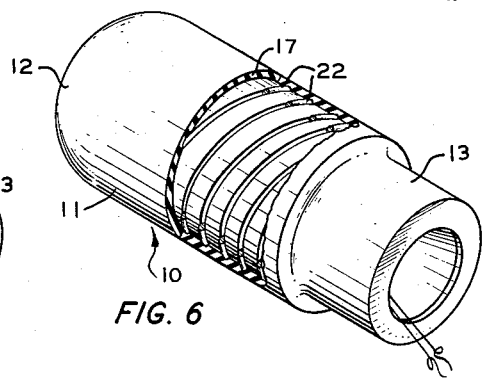
FIGURES 6 and 7 illustrate methods of applying reinforcing materials to the outer skin of the combustion chamber section.
Figure 7:
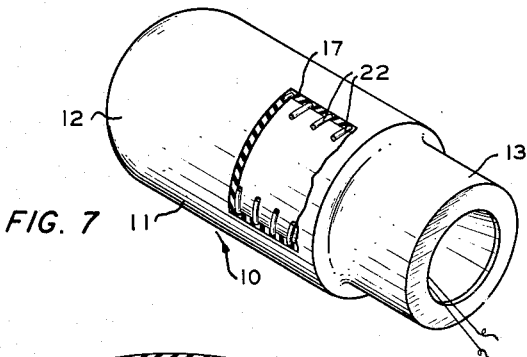

FIGURES 6 and 7 illustrate different methods of applying the reinforcing materials. In FIGURE 6, said reinforcing material 22 (wires or filaments) has been circularly wound around the combustion chamber section 11, prior to application of restrictor material 17, and cured into the skin of the propellant material in said combustion chamber section.

In FIGURE 7, reinforcing material 22 has been diagonally applied after application of resistor material 17 and cured into said restrictor material.

In operation, the inner wall of combustion chamber 15 is ignited in any desired or conventional manner as by igniter 14. When the inner wall is ignited, the missile is thereby launched and rapidly gains speed and altitude. Lead wires 16 are of small size and are readily broken when the missile is launched, as from a suitable launching platform (not shown). As the burning progresses, there is an increase in diameter of the throat of nozzle portion 13 with a consequent reduction in internal pressure in combustion chamber 15. At a predetermined point, depending upon the design of the combustion chamber and the composition of the propellant material from which said chamber is fabricated, the internal pressure will exceed the tensile strength of the walls of said combustion chamber and it will be disintegrated. Upon disintegration any particles of unconsumed propellant material will burn before striking the surface of the earth.

Any solid propellant material having a high burning rate, a high specific impulse, and high tensile strength is suitable for manufacturing rocket motors in accordance with my invention. A presently preferred propellant material is one comprising an ammonium perchlorate oxidizer component, and a butadiene-methylvinylpyridine copolymer binder component. These ammonium perchlorate propellants have a burning rate of from 0.3 to 2.5 inches per second, a specific impulse up to about 241 seconds, and suitable mechanical properties. The temperature and pressure sensitivities of these propellants are nominal.

The propellant material utilized in fabricating the rocket grains of this invention can be prepared from a variety of known compounding materials. Particularly useful propellant compositions which can be utilized in the practice of this invention are of the rubbery copolymer-oxidizer type which are plasticized and worked to prepare an extrudable mass at 140 to 190° F. The copolymer can be reinforced with suitable reinforcing agents such as carbon black, silica, and the like. Suitable oxidation inhibitors, wetting agents, modifiers, vulcanizing agents, and accelerators can be added to aid processing and to provide for the curing of the extruded propellant grains at temperatures preferably in the range of 170° to 190° F. In addition to the copolymer binder and other ingredients, the propellant composition comprises an oxidizer and a burning rate catalyst.

The solid propellant compositions particularly useful in the preparation of the propellants used in this invention can be prepared by mixing the copolymer with the solid oxidizer, a burning rate catalyst, and various other compounding ingredients so that the reinforced binder forms a continuous phase and the oxidizer a discontinuous phase. The resulting mixture is heated to effect curing of the same.

The copolymers are preferably formed by copolymerization of a vinyl heterocyclic nitrogen compound with an open chain conjugated diene. The conjugated dienes employed are those containing 4 to 6 carbon atoms per molecule and representatively included 1,3-butadiene, isoprene, 2,3-dimethyl-1,3-butadiene, and the like. The vinyl heterocyclic nitrogen compound generally preferred is a monovinylpyridine or alkyl-substituted monovinyl-pyridine, 2-methyl-5-vinylpyridine, 5-ethyl-2-vinylpyridine, pyridine such as 2-vinylpyridine, 3-vinylpyridine, 4-vinyl-2,4-dimethyl-6-vinylpyridine, and the like. The corresponding compounds in which an alpha-methylvinyl (isopropenyl) groups replaces the vinyl group are also applicable.

In the preparation of the copolymers, the amount of conjugated diene employed is in the range between 75 and 95 parts by weight per 100 parts monomers and the vinyl heterocyclic nitrogen is in the range between 25 and 5 parts. Terpolymers are applicable as well as copolymers and in the preparation of the former up to 50 weight percent of the conjugated diene can be replaced with another polymerizable compound such as styrene, acrylonitrile, and the like. Instead of employing a single conjugated diene compound, a mixture of conjugated dienes can be employed. The preferred, readily available binder employed is a copolymer prepared from 90 parts by weight of butadiene and 10 parts by weight of 2-methyl-5-vinylpyridine, hereinafter abbreviated Bd/MVP. This copolymer is polymerized to a Mooney (ML-4) plasticity value in the range of 10-40, preferably in the range of 15 to 25, and may be masterbatched with 5-20 parts of Philblack A, a furnace black, per 100 parts of rubber. Masterbatching refers to the method of adding carbon black to the latex before coagulation and coagulating to form a high degree of dispersion of the carbon black in the rubber. In order to facilitate dispersion of the carbon black in the latex, Marasperse-CB, or similar surface active agent, is added to the carbon black slurry or to the water used to prepare the slurry.

The following empirical formulation or recipe generally represents the class of propellant compositions preferred for the preparation of the propellant grains of this invention.

TABLE I

| Ingredient | Parts per 100 parts of rubber | Parts by weight |
|---|---|---|
| Binder | | 10-25 |
| Copolymer (Bd/MVP) | 100 | |
| Philblack A (a furnace black) | 10-30 | |
| Plasticizer | 10-30 | |
| Silica | 0-20 | |
| Metal oxide | 0-5 | |
| Antioxidant | 0-5 | |
| Wetting agent | 0-2 | |
| Accelerator | 0-2 | |
| Sulfur | 0-2 | |
| Oxidizer (ammonium perchlorate) | | 75-90 |
| Burning rate catalyst | | 0-30 |

Suitable plasticizers useful in preparing these propellant grains include TP-90-B (dibutoxyethoxyethyl formal supplied by Thiokol Corp.); benzophenone; and Pentaryl A (monoamylbiphenyl). Suitable silica preparations include a 10-20 micron size range supplied by Davison Chem. Co.; and Hi-Sil 202, a rubber grade material supplied by Columbia-Southern Chem. Corp. A suitable anti-oxidant is Flexamine, a physical mixture containing 65 percent of a complex diarylamine-ketone reaction product and 35 percent of N,N'-diphenyl-p-phenylenediamine, supplied by Naugatuck Chem. Corp. A suitable wetting agent is Aerosol-OT (dioctyl sodium sulfosuccinate), supplied by American Cyanamid Co. Satisfactory rubber cure accelerators include Philcure 113 (SA-113) N,N-dimethyl-S-tertiary butylsulfenyl dithiocarbamate; Butyl-8 (a dithiocarbamate-type rubber accelerator) supplied by R. T. Vanderbilt Co.; and GMF (quinone dioxime), supplied by Naugatuck Chem. Co. Suitable metal oxides include zinc oxide, magnesium oxide, iron oxide, chromium oxide, or combinations of these metal oxides. Suitable burning rate catalysts include ferrocyanides sold under various trade names such as Prussian blue, steel blue, bronze blue, Milori blue, Turnbull's blue, Chinese blue, new blue, Antwerp blue, mineral blue, Paris blue, Berlin blue, Erlanger blue, foxglove blue, Hamburg blue, laundry blue, washing blue, Williamson blue, and the like. Other burning rate catalysts such as ammonium dichromate, potassium dichromate, sodium dichromate, ammonium molybdate, and the like, can also be used.

An example of a suitable propellant composition is as follows:

*Composition of Propellant in Parts Per Hundred Parts of Propellant*

| | |
|---|---|
| Binder | 18 |
| Oxidizer | 82 |
| Particle size, microns | 8 |
| Catalyst: | |
| Ammonium dichromate | 4.0 |
| Milori blue | 2.0 |

The binder in this propellant consists essentially of a 90/10 copolymer of butadiene and 2-methyl-5-vinylpyridine with reinforcing agent, plasticizer and curative. The composition of said binder in parts per hundred parts of copolymer is as follows:

| | |
|---|---|
| Copolymer | 100 |
| Philblack A(phr.) | 20 |
| TP-90B (phr.) | 20 |
| Flexamine (phr.) | 3.0 |
| Magnesium oxide (phr.) | 0.5 |

A presently preferred propellant composition, and which is the propellant composition employed in the examples given hereinafter, is as follows.

| Ingredient | Parts per 100 parts of rubber | Parts by weight |
|---|---|---|
| Binder | | 13 |
| Copolymer (90/10 Bd/MVP) | 100 | |
| Carbon black | 22 | |
| Flexamine | 3 | |
| ZP-211 | 20 | |
| Sulfur | 1.75 | |
| Butyl eight | 2.0 | |
| Zinc oxide | 3.0 | |
| Oxidizer (ammonium perchlorate) | | 87 |
| Burning rate catalyst: | | |
| Ammonium dichromate | | 4.0 |
| Milori blue | | 2.0 |

Said propellant is preferably cured at 190° F. for 48 to 96 hours to impart the desired mechanical properties thereto.

Other propellant compositions suitable for use in this invention are disclosed and claimed in copending application, Serial No. 556,779, filed January 3, 1956.

As mentioned above, the external surfaces of the rocket motor are preferably covered with a restrictor material. The presently preferred restrictor material comprises a butadiene-methylvinylpyridine copolymer, usually the same copolymer as is used in the binder component of the propellant material. Examples of other suitable restrictor materials are as follows: asphalt and pitches including natural asphalts having a 170° F. softening point, air blown asphalts having a 270° F. softening point, mixtures of asphalt and synthetic or natural rubber, pitch having a 240° F. softening point, and mixtures of pitch and rubber; epoxy resins, such as Araldite 502 and Epon 834; liquid polymers such as polybutadiene, polybutene, polyisobutylene, and Thiokol LP-3; polyethylenes; rubbers, both natural and synthetic, such as butadiene-styrene copolymers, butyl rubber, ethyl acrylate, methyl-vinylpyridine copolymers, polybutadiene, and hydrogenated polybutadiene; waxes, both natural and synthetic having a melting point within the range of 150 to 300° F.; synthetic resins and plastics such as the various acrylic and polyvinyl resins; and nitro polymers such as polynitro methamethacrylate, nitro polybutadiene and polynitrovinyl alcohols.

Said restrictor materials can be applied in any suitable manner as by brushing, dipping, spraying, etc.

In manufacturing rocket motors according to this invention, the propellant material, when it comprises a rubbery binder such as the butadiene-heterocyclic nitrogen base copolymers, can be formulated in conventional rubber processing equipment. One convenient method for fabricating the rocket motor is to extrude the combustion chamber section 11 in conventional extrusion apparatus so as to form a perforated grain of propellant material. Head section 12 and nozzle section 13 are preferably compression molded to obtain the desired configuration. Said head section 12 and nozzle section 13 can then be joined to combustion chamber section 11 by cementing as will be understood by those skilled in the art. Suitable cements for this purpose include Thiokol Bonding Agent sold by the Thiokol Corporation of Trenton, N.J., Dutch Brand 7711 Rubber Cement sold by Van Cleef Brothers, Inc., of Chicago, Illinois and Van Cleef's Rubber bonding cement sold by Van Cleef Brothers, Inc. of Chicago, Illinois. When employing said bonding agents or cements in effecting a bond between ring 21 and motor 10, it is preferred to use a metal primer prior to applying said bonding agent or cement. A suitable metal primer is du Pont 65/1055 sold by the du Pont Company of Wilmington, Delaware. It is preferable when employing said bonding agents and metal primer to first apply the primer and/or the bonding agent to the surfaces to be bonded and allow said surfaces to "dry," i.e., permit all of the solvent or other volatile material to be evaporated prior to pressing ring 21 into contact with the outer surface of motor 10.

In another method of fabricating the rocket motor of the invention, head section 12 and combustion chamber section 13 can be compression molded, or cast when a castable propellant material is employed, in one step to form an integral combustion chamber portion.

Figure 8:
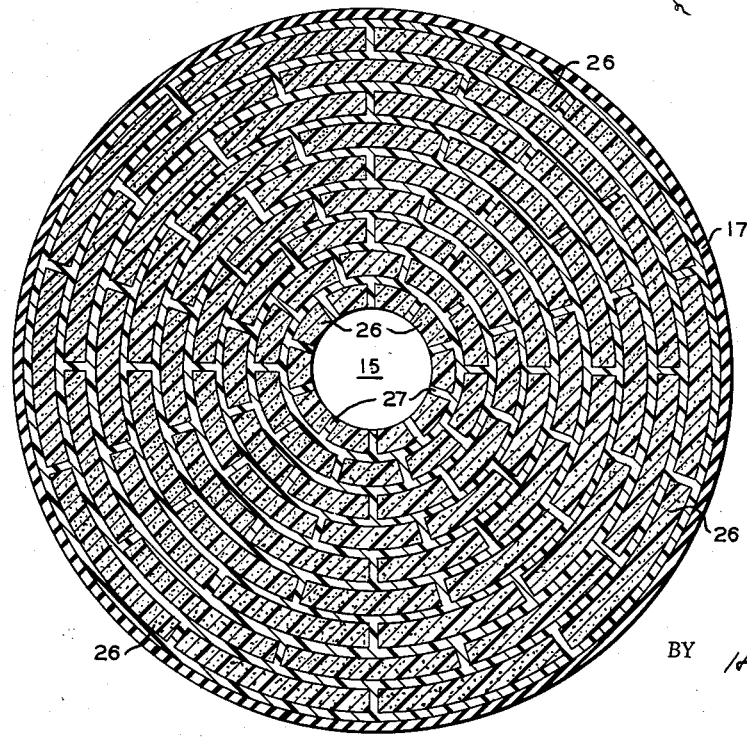
FIGURE 8 illustrates one embodiment of the invention wherein the rocket motor is fabricated from a plurality of individual propellant grains bonded together with a suitable propellant mortar.

The rocket motor of the invention can also be fabricated from a plurality of arcuate shaped individual propellant grains bonded together in a plurality of concentric cylindrical strata. FIGURE 8 illustrates this embodiment of the invention. The individual propellant grains 26 are bonded together with a "mortar" 27 comprising a resilient rubbery binder with low oxidizer content and compatible with the propellant material of said propellant grains. A first cylindrical stratum of said propellant grains can be formed around a suitable mandrel and successive series of propellant grains subsequently bonded with said mortar to the previous cylindrical stratum of propellant grains to provide a combustion chamber section similar to section 11 of rocket motor 10 in FIGURE 1. A nozzle section and a head section similar to nozzle section 13 and head section 12, respectively, of rocket motor 10 in FIGURE 1, can be formed of individual propellant grains by forming a solid block of rectangular grains and then machining said block, as on a lathe or other suitable machine, to the desired configuration. The burning rate of the mortar used in fabricating a rocket motor from individual propellant grains as described is preferably of substantially the same burning rate as said propellant grains. Particularly useful polysulfide liquid polymer formulations which can be employed in said propellant are those such as LP-2, LP-3, and LP-8 prepared by the Thiokol Corp. Ammonium perchlorate is incorporated in these polymers in an amount necessary to impart the desired burning rate to the finished mortar. Suitable propellant mortar formulations are for example: in weight percents, ammonium perchlorate 40-90; LP-3, 10-155; p-quinone dioxime 0-5; and diphenyl quanidine 0-3.

In the manufacture of a rocket motor according to this invention, consideration should be given to the internal diameter, I.D., of the combustion chamber, the outer diameter, O.D., and the length, L, of the rocket motor because these dimensions are all interrelated.

Pressure in the caseless rocket diminishes as the propellant is burned, because the diameter of the nozzle increases. Therefore, as the shell of propellant is decreased in thickness by burning of the propellant, with consequent decrease in strength, the pressure also decreases allowing the caseless propellant to burn for a longer time before disintegrating. The rocket motor disintegrates when the propellant burns to a thin shell that cannot withstand the pressure within the combustion chamber. The fragments of propellant burn before the pieces reach the earth.

As mentioned above a reinforcing material can be incorporated in the outer skin of the rocket motor. Said reinforcing material, when employed, is employed primarily to increase reproducibility of the point of break-up. Some extension of burning time thus results in some instances. The propellant compositions from which the rocket motors of the invention are fabricated are extremely well mixed mixtures comprising a binder component as the continuous phase and an oxidizer component as the dispersed phase. These well mixed mixtures have unusually uniform burning rates and when employed in rocket motors according to the invention will burn uniformly to a minimum thickness to produce a combustion chamber of uniformly increasing diameter. Said reinforcing materials are thus not essential and do not serve as a case.

The nozzle must increase in diameter during operation. Otherwise, there would be a tremendous increase in pressure within the combustion chamber and the rocket motor would explode. Therefore, the nozzle must burn at a proper rate in relation to the burning rate of the propellant comprising the combustion chamber of the rocket motor. Thus, in the design of nozzles to be used in the rocket motors of this invention, consideration must be given to the thrust-time relationship desired, the static pressure in the throat of the nozzle, the amount of erosion of the internal nozzle surfaces and the burning rate of the propellant material comprising the combustion chamber of the rocket motor.

If desired, the nozzle can be fabricated from the same type propellant material as is employed in fabricating the combustion chamber portion of the rocket motor. However, it will usually be necessary to adjust the burning rate of said propellant material. This can be done by varying the oxidizer content and/or the type and content of burning rate catalyst.

Castable propellant material can also be used to fabricate the nozzle and combustion chamber portions of the rocket motor. For example, the polyurethane type propellants such as:

|  | Percent by weight | Parts per 100 parts of Propellant |
|---|---|---|
| Binder: |  |  |
| Castor oil | 37.9 |  |
| Flexrecin-15 [1] | 37.0 |  |
| TDI [2] | 25.1 |  |
|  | 100.0 | 21 |
| Oxidizer—Ammonium perchlorate: |  |  |
| 290 micron-weight avg. particle size | 55.3 |  |
| 14-18 micron-weight avg. particle size | 23.7 | 79 |

[1] A ricinoleic acid ester of castor oil. Available from the Baker Castor Oil Co.
[2] Tolylene diisocyanate.

Other castable propellant materials which can be used include Aeroplex-ammonium perchlorate propellant; Thiokol-ammonium perchlorate propellant; asphalt-potassium perchlorate propellant; and cast double base propellant. When the same type propellant material is used to fabricate both the nozzle portion and the combustion chamber portion of the rocket motor, the burning rate of the propellant material used in the nozzle portion is adjusted relative to the burning rate of the propellant material used in the combustion chamber portion as discussed above.

EXAMPLE I

A rocket motor is to be designed according to the invention utilizing a propellant having the following characteristics.

Characteristic exhaust velocity (C*)____ 4880 ft./sec.
Density_____ 0.060 lbs./in.$^3$
Burning rate @ 1000 p.s.i._____ 1″/sec.
Pressure exponent_____ 0.45
Allowable working stress_____ 300 p.s.i.

Assume that the rocket motor is to be 30 inches long, have an external diameter of 15 inches, and will develop an initial combustion chamber pressure of 275 p.s.i.g. Referring to FIGURE 1 where the dimensions are indicated, the following symbols can be conveniently employed in designing the rocket motor.

$A$=burning area in combustion chamber (in.$^2$)
$A_t$=throat cross-sectional area (in.$^2$)
$C^*$=characteristic exhaust velocity (ft./sec.)
$C_F$=thrust coefficient
$g$=gravity constant (32.3 ft./sec.$^2$)
$K_n$=ratio of area of propellant burning surface to area of throat
$L$=length of motor (in. or ft.)
$P$=chamber pressure (p.s.i.)
$\phi$=density of propellant (lbs./in.$^3$)
$F$=thrust (pounds)
$I$=impulse (pounds-seconds)
$I_{sp}$=specific impulse (seconds)
$r_o$=external radius (in.)
$r_i$=initial internal radius (in.)
$r_t$=throat radius (in.)
$r$=internal radius (during burning) (in.)
$R$=burning rate, dr./dt. (in./sec.)
$S_t$=tensile strength (p.s.i.)
$t$=time (seconds)
$n$=propellant pressure exponent The mechanical strength of the thinning motor walls must balance the wall strength required by the chamber pressure. In order for this requirement to be met, the relationship (1) $$S_t = P\left(\frac{r_o^2 + r^2}{r_o^2 - r^2}\right)$$

must hold, and this equation together with (2) $$K_n = \frac{A}{A_t} = \left(\frac{1000g}{\varphi C^* R_{1000}}\right)\left(\frac{P}{1000}\right)^{1-n}$$

(3) $$R = \frac{dr}{dt} = R_{1000}\left(\frac{P}{1000}\right)^n$$

define the relationships between P, r and $r_t$, since the propellant to be used determines $S_t$, $K_{n1000}$, $R_{1000}$, $\phi$ and $n$. Overall design considerations will place restraints on $t$, L and $r_o$. These relationships and the familiar rocket performance equations $F = PA_tC_F$ and $I = \int F dt$ permit the design of caseless motors.

Employing the above relationships it is calculated that the initial radius $r_i$ of the combustion chamber 15 is 1.575 inches and the initial radius $r_t$ of the nozzle throat is 1.183 inches.

$$F = PA_tC_F$$

Assume the mean value of $C_F$ is 1.33, then $F = 1.33 PA_t$ and corresponding values of F and r are calculated to be

| r | F |
|---|---|
| 1.575 | 1603 |
| 2.0 | 2022 |
| 3.0 | 2912 |
| 4.0 | 3587 |
| 5.0 | 3932 |
| 6.0 | 3792 |
| 7.0 | 2726 |
| 7.5 | 0 |

Figure 9:
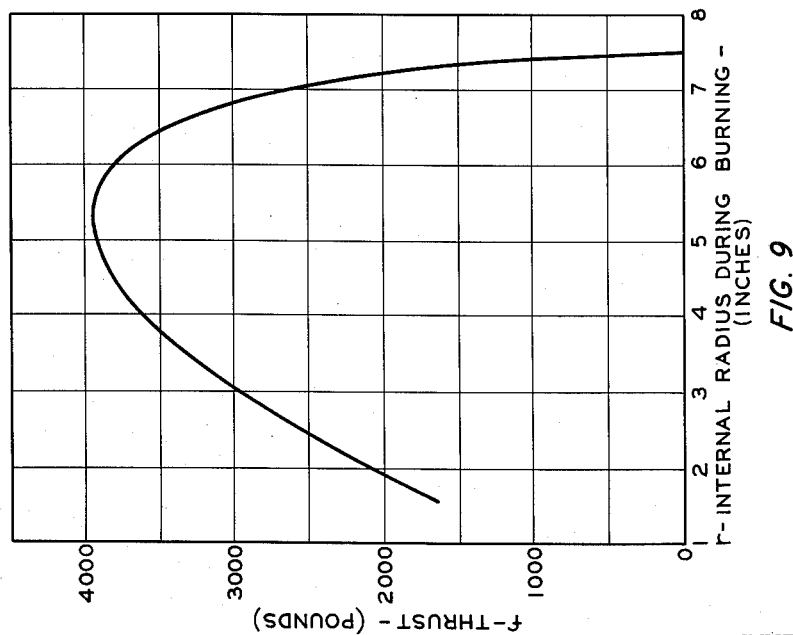

These values are plotted in FIGURE 9 which is a thrust-thickness curve showing variation in thrust developed as the web of the motor burns out. Said curve "peaks" because as the radius $r$ is increasing, the radius $r_t$ of the nozzle throat is also increasing.

Employing the relationship $$R = \frac{dr}{dt} = R_{1000}\left(\frac{P}{1000}\right)^n$$

corresponding values of $r$ and $t$ are calculated to be

| $r$ | $t$ |
|---|---|
| 1.575 | 0 |
| 2.0 | 0.75 |
| 3.0 | 2.62 |
| 4.0 | 4.75 |
| 5.0 | 7.19 |
| 6.0 | 10.18 |
| 7.0 | 14.43 |
| 7.5 | $\infty$ |

Figure 10:
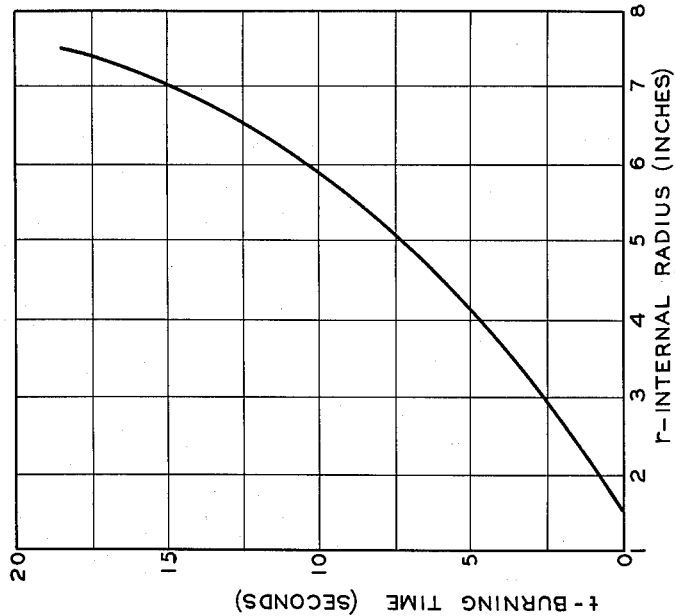

These values are plotted in FIGURE 10 to give a burning curve showing the variation of the internal radius $r$ (during burning) of the combustion chamber with burning time $t$.

| $r$ | $r_t$ | $t$ |
|---|---|---|
| 1.575 | 1.18 | 0 |
| 2.0 | 1.36 | 0.75 |
| 3.0 | 1.8 | 2.62 |
| 4.0 | 2.28 | 4.75 |
| 5.0 | 2.86 | 7.19 |
| 6.0 | 3.7 | 10.18 |
| 7.0 | 5.63 | 14.43 |

FIGURE 11 shows the relationship between burning time $t$ and nozzle throat radius $r_t$. Since $r_t$ is linear with respect to $t$, the propellant from which the nozzle is fabricated should have a constant burning rate of $$\frac{r_t - 1.18}{t - 0} = \frac{3.7 - 1.18}{10.5} = 0.24 \text{ in./sec.}$$

independent of pressure and velocity.

Cross reading FIGURES 9 and 10, the following table

| F | t | r |
|---|---|---|
| 1603 | 0 | 1.575 |
| 2680 | 2 | 2.7 |
| 3420 | 4 | 3.7 |
| 3820 | 6 | 4.65 |
| 3950 | 8 | 5.32 |
| 3782 | 10 | 5.95 |
| 3440 | 12 | 6.48 |
| 2800 | 14 | 6.92 |
| 2000 | 16 | 7.22 |
| 1920 | 16.2 | 7.25 |

FIGURE 12, shows the relationship between thrust F, and time $t$, during burning of the motor.

Assuming the motor will be discarded when the wall of the combustion chamber has decreased to ¼ inch in thickness, then $$I = \int_0^{16.2} F\,dt = 52{,}300 \text{ pounds seconds}$$

The volume of propellant in the above motor is calculated from

Volume $= \pi(r_o^2 L + 4/6 r_o^3) = (\pi r_i^2 L + 4/6 r_i^3)$
Volume $= 4670$ cubic inches Adding 10 percent for the nozzle, the total volume is 5137 cubic inches. The density of the propellant is 0.06 lb. per cubic inch. Therefore, the weight of the rocket motor is 5137 (0.06) = 308 pounds. The overall specific inpulse is 52,300/308 = 170 seconds.

A nozzle such as is commonly used in rocket motors is not essential for propulsion. For a given propellant, there is one length and a set of dimensions for which a nozzle is not necessary. In such motors, the increase in diameter is such as to maintain thrust substantially constant. Design of a nozzleless motor in accordance with the invention is illustrated in the following Example II.

EXAMPLE II

A nozzleless motor is designed similarly as in Example I. In a nozzleless motor $r = r_t$. Using the same relationships as in Example I, it is calculated that beyond $r = 7.3$ the allowable tensile strength of the propellant material will be exceeded.

| F | r |
|---|---|
| 1010 | 1.575 |
| 1087 | 2.0 |
| 1245 | 3.0 |
| 1420 | 4.0 |
| 1568 | 5.0 |
| 1741 | 6.0 |
| 1900 | 7.0 |
| 1950 | 7.3 |

These values are plotted in FIGURE 13.

Corresponding values of $r$ and $t$ are calculated, as in Example I, to be

| $r$ | $t$ |
|---|---|
| 1.575 | 0 |
| 2.0 | 1.34 |
| 3.0 | 5.29 |
| 4.0 | 10.39 |
| 5.0 | 16.49 |
| 6.0 | 23.57 |
| 7.0 | 31.47 |
| 7.3 | 33.96 |

These values are plotted in FIGURE 14.

Cross reading FIGURES 9 and 10, the following table is prepared.

| F | t | r |
|---|---|---|
| 1010 | 0 | 1.575 |
| 1110 | 2 | 2.2 |
| 1200 | 4 | 2.7 |
| 1275 | 6 | 3.15 |
| 1340 | 8 | 3.56 |
| 1410 | 10 | 3.92 |
| 1460 | 12 | 4.27 |
| 1510 | 14 | 4.58 |
| 1570 | 16 | 4.9 |
| 1610 | 18 | 5.2 |
| 1660 | 20 | 5.5 |
| 1710 | 22 | 5.78 |
| 1755 | 24 | 6.05 |
| 1800 | 26 | 6.33 |
| 1835 | 28 | 6.58 |
| 1875 | 30 | 6.85 |
| 1915 | 32 | 7.1 |
| 1950 | 34 | 7.3 |

FIGURE 15 shows the relationship between thrust F, and time $t$, during burning of the motor.

The above disclosure shows that "caseless" rocket motors, i.e., rocket motors consisting essentially of propellant material can be fabricated in a wide range of sizes, and having a wide range of thrust. While specific embodiments have been set forth for illustrative purposes, the invention is not to be limited to said embodiments.

I claim:

A method for manufacturing a rocket motor consisting essentially of solid propellant material having a suitable burning rate at a combustion chamber working pressure as low as 10 pounds per square inch absolute and sufficient tensile strength to withstand a working pressure of at least 10 pounds per square inch absolute in said combustion chamber, said rocket motor comprising, a head section defining a segment of a sphere and having a recess in the uncurved side thereof, a cylindrical combustion chamber section having an axially disposed perforation therethrough, and a nozzle section having an axially disposed venturi-shaped opening therethrough, which method comprises in combination the steps of: bonding a plurality of rectangular shaped grains of propellant material together at their ends and sides with a propellant mortar to form a pair of solid blocks of propellant material; machining one of said blocks to form said head section; machining the other of said blocks to form said nozzle section; bonding a first series of arcuate shaped propellant grains together at their ends with propellant mortar around a mandrel so as to form a first cylindrical stratum of said arcuate shaped grains; bonding successive series of said arcuate shaped grains together at their ends and to said first stratum to form a plurality of concentric cylindrical strata forming said combustion chamber section; removing said mandrel from said thus formed combustion chamber; bonding one end of said thus formed combustion chamber section to the uncurved side of said machined head section; and bonding said machined nozzle section to the other end of said thus formed combustion chamber section to form said motor.

References Cited in the file of this patent

UNITED STATES PATENTS

| | | |
|---|---|---|
| 702,208 | Hayner | June 10, 1902 |
| 1,530,692 | Paulus | Mar. 24, 1925 |
| 1,560,628 | Wiley | Nov. 10, 1925 |
| 1,808,877 | Young | June 9, 1931 |
| 1,901,852 | Stolfa et al. | Mar. 14, 1933 |
| 2,114,214 | Damblanc | Apr. 12, 1938 |
| 2,206,057 | Skinner | July 2, 1940 |
| 2,563,265 | Parsons | Aug. 7, 1951 |
| 2,658,332 | Nicholson | Nov. 10, 1953 |
| 2,783,138 | Parsons | Feb. 26, 1957 |
| 2,912,820 | Whitmore | Nov. 17, 1959 |
| 2,941,878 | Mahan et al. | June 21, 1960 |

FOREIGN PATENTS

| | | |
|---|---|---|
| 26,430 | Great Britain | Nov. 29, 1907 |